«12» United States Patent
Tamuraya et al.

(10) Patent No.: US 9,375,997 B2
(45) Date of Patent: Jun. 28, 2016

(54) SUN VISOR FOR AUTOMOBILE

(71) Applicants: Nissan Motor Co., Ltd., Kanagawa (JP); Kasai Kogyo Co., Ltd., Kanagawa (JP)

(72) Inventors: Makoto Tamuraya, Kanagawa (JP); Shoichiro Obara, Kanagawa (JP); Hiroaki Wakisaka, Tochigi (JP); Mitsuru Akiyama, Tochigi (JP); Hiroyuki Takeda, Tochigi (JP); Minoru Tagami, Tochigi (JP); Yutaka Okazaki, Kanagawa (JP); Yoshiaki Kazama, Kanagawa (JP)

(73) Assignees: Nissan Motor Co., Ltd., Kanagawa (JP); Kasni Kogyo Co., Ltd., Kanagawa (JP)

( * ) Notice: Subject to any disclaimer, the term of this patent is extended or adjusted under 35 U.S.C. 154(b) by 0 days.

(21) Appl. No.: 14/417,009

(22) PCT Filed: Jul. 24, 2013

(86) PCT No.: PCT/JP2013/069992
§ 371 (c)(1),
(2) Date: Jan. 23, 2015

(87) PCT Pub. No.: WO2014/017510
PCT Pub. Date: Jan. 30, 2014

(65) Prior Publication Data
US 2015/0202947 A1    Jul. 23, 2015

(30) Foreign Application Priority Data

Jul. 24, 2012  (JP) ................ 2012-163581
Jul. 24, 2012  (JP) ................ 2012-163584
Jul. 24, 2012  (JP) ................ 2012-163588
Jul. 24, 2012  (JP) ................ 2012-163590

(51) Int. Cl.
*B60J 3/02*    (2006.01)

(52) U.S. Cl.
CPC ............. *B60J 3/0278* (2013.01); *B60J 3/023* (2013.01); *B60J 3/0208* (2013.01); *B60J 3/0234* (2013.01); *B60J 3/0282* (2013.01)

(58) Field of Classification Search
CPC .................. B60J 3/0208; B60J 3/02
USPC ............................... 296/97.3, 97.4
See application file for complete search history.

(56) References Cited

U.S. PATENT DOCUMENTS 4,320,921 A     3/1982  Schatzler
5,674,118 A *  10/1997  Prock ............... B60S 1/54
                                            454/127

(Continued)

FOREIGN PATENT DOCUMENTS

JP    11-301262 A      11/1999
JP    2003-165332 A    6/2003
JP    2009-096350 A    5/2009
JP    2011-020631 A    2/2011

OTHER PUBLICATIONS

International Search Report issued in PCT/JP2013/069992 mailed on Sep. 10, 2013 (2 pages).

(Continued)

*Primary Examiner* — Pinel Romain
(74) *Attorney, Agent, or Firm* — Osha Liang LLP

(57) ABSTRACT

A sun visor for a vehicle configured to be engaged with a support section provided in a compartment of the vehicle has a sun visor main body that shields light, a supplementary body slidably attached to the sun visor main body and slidable from a first position where the supplementary body overlaps the sun visor main body to a second position where the supplementary body is drawn out of the sun visor main body to shield the light in a wider area, projections standing on peripheries of the through-holes, and a plurality of through-holes penetrating the supplementary body so as to have incident light partly pass through the through-holes.

7 Claims, 12 Drawing Sheets

(56) References Cited

U.S. PATENT DOCUMENTS

| | | | |
|---|---|---|---|
| 6,439,638 B1 * | 8/2002 | Kawasaki | B60J 3/0204 296/97.2 |
| 7,216,918 B1 | 5/2007 | Runfola | |
| 7,527,317 B2 * | 5/2009 | Ogawa | B60J 3/0204 296/97.5 |
| 2007/0164582 A1 | 7/2007 | Ishikura et al. | |

OTHER PUBLICATIONS

Written Opinion of the International Searching Authority issued in PCT/JP2013/069992 mailed on Sep. 10, 2013 (4 pages).
International Preliminary Report on Patentability from PCT/JP2013/069992 issued on Oct. 21, 2014 (6 pages).

* cited by examiner

FIG. 2
(a)
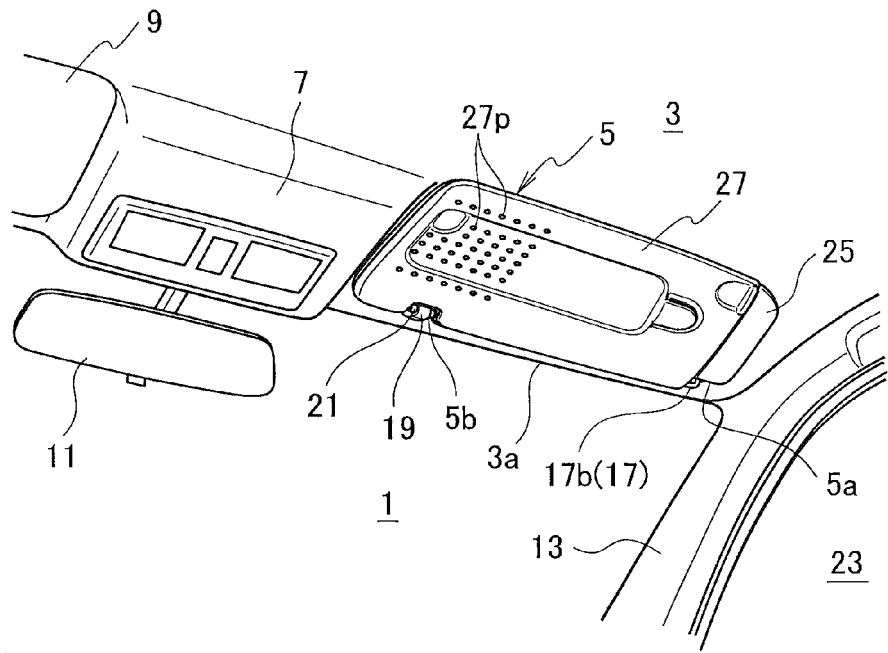
(b)
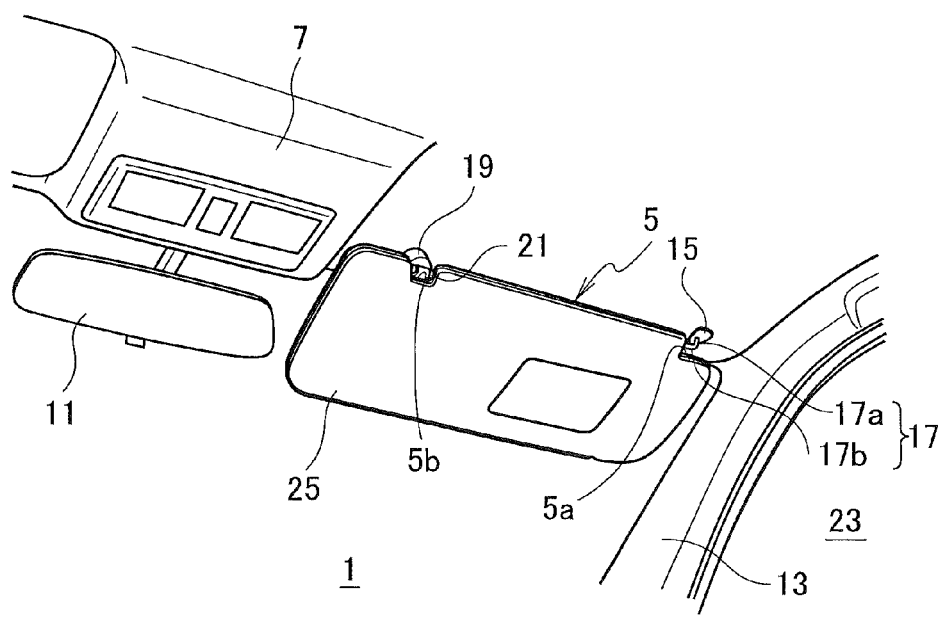

FIG. 3
(a)
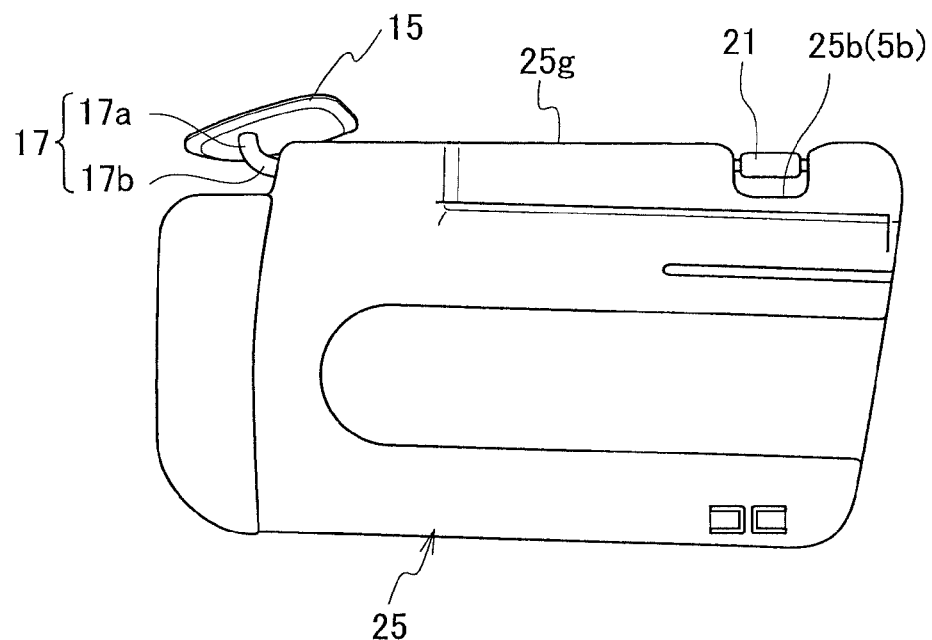
(b)
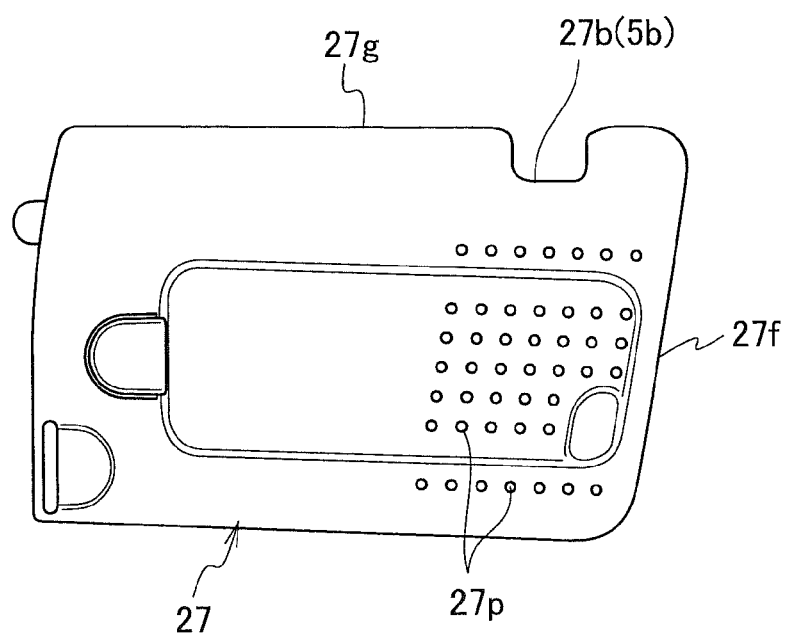

FIG. 5
(a)
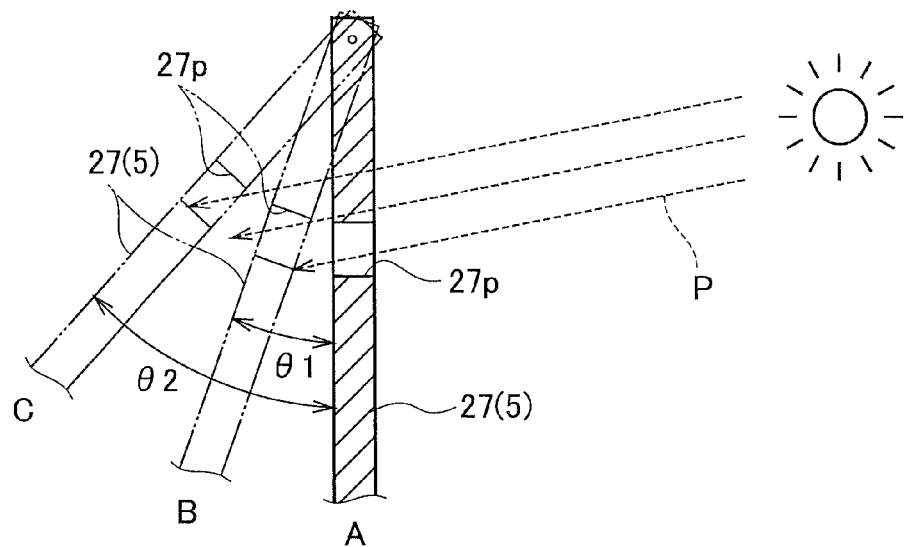
(b)
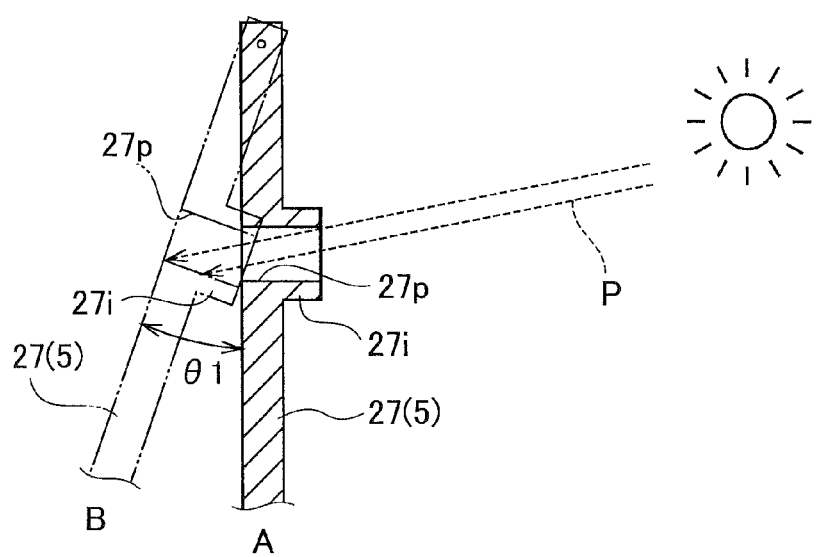

FIG. 10
(a)
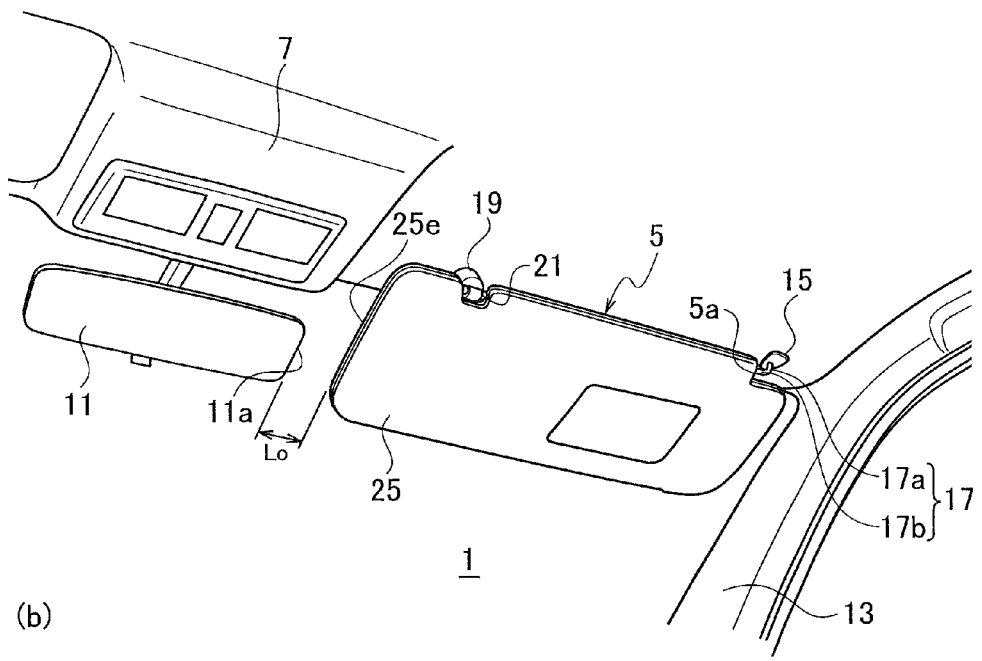
(b)
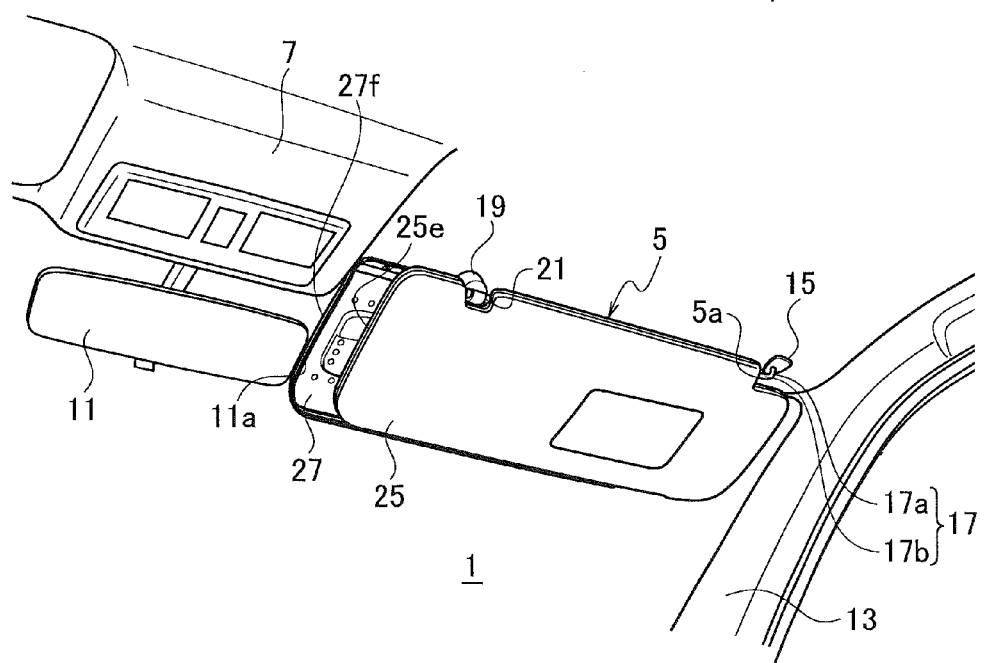

SUN VISOR FOR AUTOMOBILE

BACKGROUND

1. Technical Field

The present invention relates to a sun visor for an automobile, which shields incident light through a windshield and side windows of the automobile.

2. Related Art

Many vehicles are equipped with sun visors for the purpose of preventing occupants from being dazzled by intense sun light through a windshield or side windows. A sun visor is generally installed near the windshield on a ceiling and flipped down to cover the windshield in part or directed at any of side windows to cover the side window in part. The PTL 1 discloses an art related to a sun visor for an automobile.

In accordance with the related art disclosed in the PTL 1, by drawing a supplementary body out of a main body in the horizontal direction, the sun visor can expand the range of light shielding. This art could further reduce a possibility that occupants are dazzled but may further limit their visual ranges.

CITATION LIST

Patent Literature

[PTL 1]: Japanese Patent Application Laid-open No. 2011-20631

SUMMARY

The present invention is intended to provide a sun visor for an automobile, which can expand the range of light shielding but suppress limitation of visual ranges of occupants.

According to an aspect of the present invention, a sun visor for a vehicle used by being engaged with a support section provided in a compartment of the vehicle is comprised of: a sun visor main body configured to shield light; a supplementary body slidably attached to the sun visor main body and slidable from a first position where the supplementary body overlaps the sun visor main body to a second position where the supplementary body is drawn out of the sun visor main body to shield the light in a wider area; and a plurality of through-holes penetrating the supplementary body so as to have incident light partly pass through the through-holes.

The device can expand the range of light shielding but suppress limitation of visual ranges of occupants.

BRIEF DESCRIPTION OF DRAWINGS

FIG. 2 is a perspective view depicting the sun visor for the automobile along with a part of a compartment including a windshield, in which (a) shows a state where it is retracted toward a ceiling and (b) shows a state where it is flipped down.

FIG. 3 is an elevational perspective view of the sun visor for the automobile, in which (a) shows only the main body and (b) shows only the supplementary body.

FIG. 5 is a schematic sectional side view for explaining change in light intensity through small holes depending on the angle of the sun visor, in which (a) shows an example and (b) shows another example with projections standing on peripheries of the small holes.

FIG. 10 is another perspective view of the sun visor for the automobile shown in FIG. 9, in which (a) shows a state where it is flipped down and (b) shows a state where a supplementary body is drawn out of a main body.

DETAILED DESCRIPTION

Figure 1:
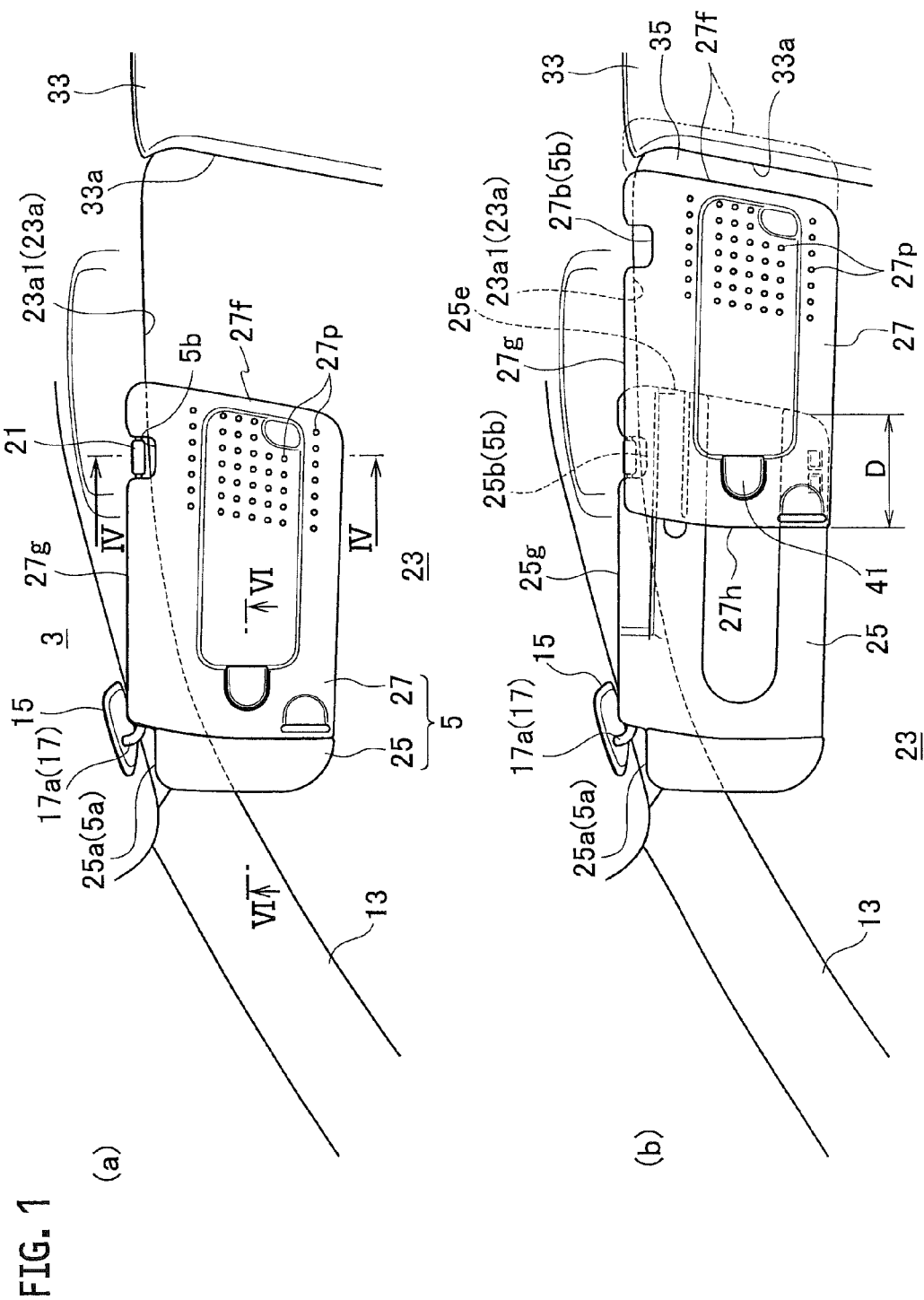
FIG. 1 is an elevational view depicting a sun visor for an automobile according to an embodiment of the present invention along with a part of a side window of a vehicle, in which (a) shows a state where a supplementary body overlaps a main body and (b) shows a state where the supplementary body is drawn out of the main body.

Exemplary embodiments of the present invention will be described hereinafter with reference to the appended drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Referring to FIG. 2, in a compartment of a vehicle, close to a windshield 1 and on a ceiling 3 provided is a sun visor 5. While FIG. 2 mainly shows an example of an occupant's seat at the right of the front seats of the vehicle, in general, a sun visor 9 is also, as being substantially symmetrical thereto, provided at the front of an occupant's seat at the left of the front seats of the vehicle. Between the sun visors 5,9 disposed is a unit 7 housing a lighting device and such, and below them disposed is a room mirror 11.

The sun visor 5 (the sun visor 9 as well) is, when there is no need for light shielding, in general, flipped upward to face the ceiling 3 as shown in FIG. 2(a), and is as needed flipped down to be used for light shielding as shown in FIG. 2(b).

The sun visor 5 for the right occupant's seat is taken as an example to give the following descriptions but the description can apply to the sun visor 9 for the left occupant's seat apart from the distinction of the right and the left. Further in the descriptions below, a lateral direction of the vehicle in a state shown in FIG. 2(a), 2(b) is referred to as a lateral direction, a direction directed to the ceiling as an upward direction, and a direction opposed thereto as a downward direction.

On the ceiling 3, very close to its foremost edge 3a, and also close to a right front pillar 13, provided is a stay 17. The sun visor 5 is correspondingly comprised of an installation portion 15 and is swingably supported via the installation portion 15 by the stay 17. The stay 17 has a longitudinal shaft portion 17a extending downward from the installation portion 15 and a lateral shaft portion 17b curved about at about 90 degrees and extending in a lateral direction from the longitudinal shaft portion 17a. The lateral shaft portion 17b is rotatably inserted into a longitudinal wall of a cutout portion 5a formed at a corner portion of the sun visor 5.

On the ceiling 3, as being apart from the right front pillar 13, and close to the unit 7, further provided is a rotation support section 19. The sun visor 5 is, as being corresponding thereto, comprised of a horizontal shaft portion 21. The horizontal shaft portion 21 is detachably engaged with the rotation support section 19, thereby the sun visor 5 is caught by the ceiling 3.

The sun visor 5 is swingably supported to have the lateral shaft portion 17b and the horizontal shaft portion 21 as an axis. The sun visor 5, when being swung downward from the retracted state shown in FIG. 2(a) around the lateral shaft portion 17b, gets into a use state (first use state) in which it covers the upper portion of the windshield as shown in FIG. 2(b).

The sun visor 5 has a cutout 5b at one of vertically both ends and the horizontal shaft portion 21 is provided within the cutout 5b. The rotation support section 19 has a shape like a short cylinder and its cylindrical surface is cut out at the side toward the foremost edge 3a of the ceiling 3 so that the portion 19 has an opening, thereby forming a shape of a hook. The horizontal shaft portion 21 fits in or gets disengaged from the rotation support section 19 through this opening. The sun visor 5 disengaged from the rotation support section 19 can swing in the lateral direction around the longitudinal shaft portion 17a, thereby getting into a use state (second use state) in which it covers the upper portion of the side window 23 as shown in FIG. 1(a). Although not shown, any structure equivalent to the rotation support section 19 may be provided at the side of the side window 23 for the purpose of temporarily fixing the sun visor 5 in this state.

The sun visor 5 is in general comprised of a sun visor main body 25 and a supplementary body 27. The supplementary body 27 is slidably attached to the sun visor main body 25, thereby sliding in the lateral direction of the sun visor main body 25. The supplementary body 27 is slidable from a first position where it overlaps the sun visor main body 25 as shown in FIG. 1(a) to a second position where it is drawn out of the sun visor main body 25 to shield the light in a wider area as shown in FIG. 1(b).

The sun visor main body 25 is comprised of a cutout portion 25a corresponding to the cutout portion 5a of the sun visor 5 and a cutout portion 25b corresponding to the cutout 5b. The supplementary body 27 is also comprised of a cutout 27b to be aligned with the cutout 5b when the supplementary body 27 is at the aforementioned first position.

Figure 4:
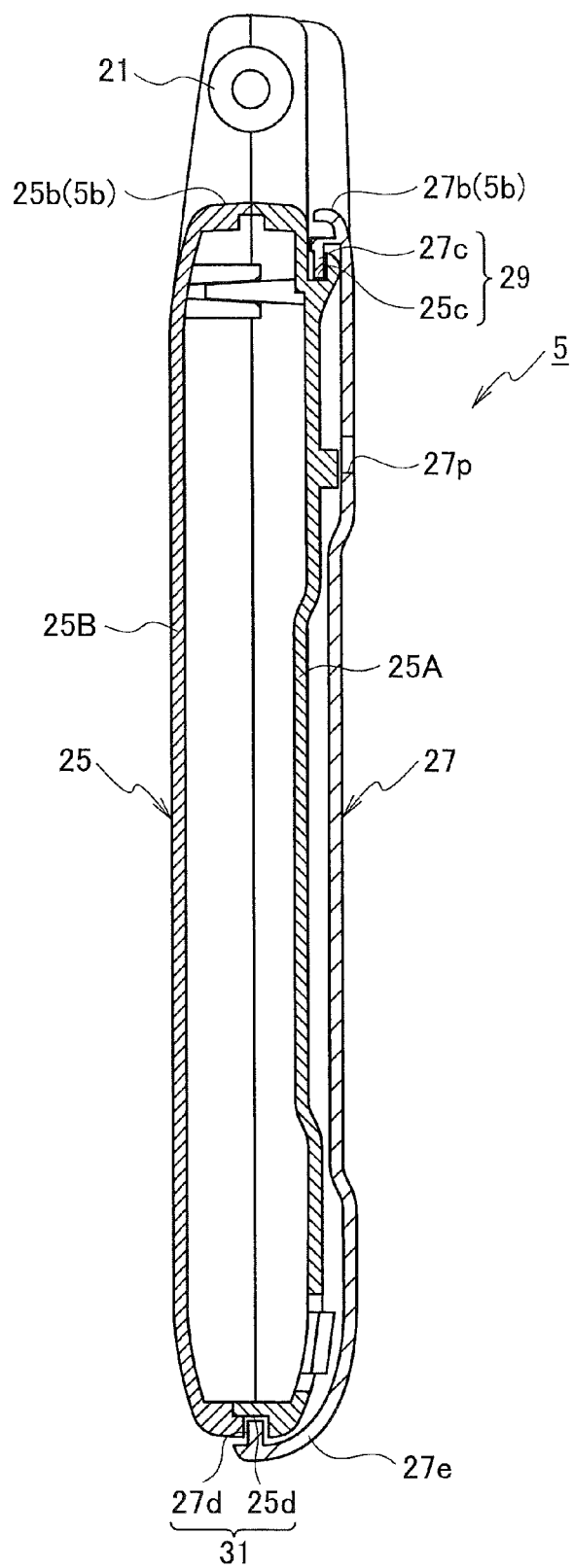
FIG. 4 is a sectional view taken from the line IV-IV of FIG. 1.

The sun visor main body 25 is, as shown in FIG. 4, a hollow body formed by joining two members 25A,25B in general. Each of the members 25A,25B is a molded article formed from a proper resin, where the first member 25A faces the supplementary body 27 and the second member 25B is opposed thereto. The supplementary body 27 is also a molded article formed from a proper resin, faces the first member 25A and is attached therewith in a way to be slidable in a lateral direction. Meanwhile this lateral direction is a direction perpendicular to the paper face of FIG. 4.

In the second use state where the sun visor 5 covers the upper portion of the side window 23, the supplementary body 27 is, as shown in FIG. 1(a), exposed to the interior of the compartment. In the first use state where the sun visor 5 covers the upper portion of the windshield 1, the supplementary body 27 is, as shown in FIG. 2(b), hidden from the compartment and faces the windshield 1, but is, when flipped up (retracted) as shown in FIG. 2(a), exposed to the interior of the compartment.

The supplementary body 27 is, in its longitudinal length, preferably as long as the longitudinal length of the sun visor main body 25. More preferably, the supplementary body 27 is, in its lateral length, properly shorter than the lateral length of the sun visor main body 25. The supplementary body 27 may be made shorter by a length corresponding to the cutout portion 25a for example than the sun visor main body 25.

An edge 27f of the supplementary body 27, which is to be foremost in a direction where the supplementary body 27 is drawn out (rearward relative to the direction of the vehicle in the second use state), may be formed to be substantially parallel to a corresponding edge 25e of the sun visor main body 25.

The supplementary body 27 may be comprised of a plurality of small holes 27p, each of which is circular for example. Each of the small holes 27p is a through-hole penetrating the supplementary body 27 and have incident light partly pass therethrough. Instead of a circular shape, an oval shape or any polygonal shape including a rectangular shape may be applied thereto, or instead any shape with a large aspect ratio such as a slit may be applied thereto.

The plurality of small holes 27p is formed in a region eccentric toward the edge 27f which is utmost in the direction where the supplementary body 27 is drawn out. The plurality of small holes 27p may be arranged in lines along both the lengthwise direction and the lateral direction, or may be arranged in another form.

As the small holes 27p are formed in the eccentric region toward the edge 27f, when the supplementary body 27 is drawn out of the sun visor main body 25 as shown in FIG. 1(b), the device makes incident light pass through the small holes 27p and provides a visual field to the exterior of the compartment through the small holes 27p.

Referring to FIG. 4, the sun visor 5 is comprised of structures 29,31 for supporting and allowing slide of the supplementary body 27. The upper structure 29 is for example comprised of a slot 25c of which the sun visor main body 25 is unitarily comprised, and a ridge 27c engageable therewith, of which the supplementary body 27 is comprised. The lower structure 31 is similarly comprised of a slot 25d and a ridge 27d. The slots 25c,25d and the ridges 27c,27d run in the lateral direction of the supplementary body 27 and engage mutually so as to allow slide of the supplementary body 27 in the lateral direction. The slot 25c is preferably directed upward and the ridge 27c is directed downward so as to mate therewith. The slot 25d is similarly directed downward and the ridge 27d is directed upward. As the upper structure 29 and the lower structure 31 are opposed to each other, the supplementary body 27 is barred from displacing upward or downward to fall off from the sun visor main body 25.

Further, the supplementary body 27 may be comprised of a curved surface portion 27e curved to run around the lowermost end of the sun visor main body 25. The ridge 25d may be provided on and inside the lowermost end of the curved surface 27e. As being structured in this way, the function that the ridges 27c,27d pinch the sun visor main body 25 is strengthened, thereby the supplementary body 27 is made further unlikely to fall off.

Mainly referring to FIG. 1, the edge 27f of the supplementary body 27, which is directed to the center pillar 33 (the rearmost edge relative to the direction of the vehicle) in the second use state, may be formed to be parallel to a side edge portion 33a of the center pillar 33, which is directed forward relative to the direction of the vehicle. The side edge portion 33a of the center pillar 33 may be slanted so that its upper portion is at the back (the right in FIG. 1(a)) relative to the direction of the vehicle as compared with its lower portion. The edge 27 may be slanted accordingly. As they run in parallel, a gap 35 between the edge 27f and the side edge portion 33a of the center pillar 33 is made minimal, thereby improving the quality of light shielding.

The supplementary body 27 may be so structured that an uppermost edge 27g of the supplementary body 27 is, in a state of being drawn out, disposed above an uppermost edge portion 23a1 of an opening portion 23a of the side window 23. The supplementary body 27 may be so structured that an uppermost edge portion 25g of the sun visor main body 25 is also disposed above the uppermost edge portion 23a of the opening portion 23a of the side window 23.

The widths of the sun visor main body 25 and the supplementary body 27 and/or the lengths of the structures 29,31 may be regulated not to leave the gap 35 between the edge 27f and the side edge portion 33a of the center pillar 33 when being drawn out. Further, as shown by the double-dotted line in FIG. 1(b), the edge 27f and the side edge portion 33a of the center pillar 33 may be regulated to overlap each other.

Any proper engaging body may be provided on the sun visor main body 25 and the supplementary body 27 in order to prevent the supplementary body 27 from being excessively drawn out. Such an engaging body is beneficial to arrest the supplementary body 37 at a position of a solid line or a double-dotted line in FIG. 1(b).

The sun visor 5 is used in a way as described below. An occupant grasps its upper portion for example of the sun visor 5 and then, from the retracted state shown in FIG. 2(a), swings it down around the lateral shaft portion 17b of the stay 17. Then the sun visor 5 comes into the use state (first use state) where it covers the upper portion of the windshield 1 shown in FIG. 2(b). The sun visor 5 can thereby shield incident light such as sun light through the windshield 1 into the compartment.

The occupant, from the first use state shown in FIG. 2(b), detaches the horizontal shaft portion 21 of the sun visor 5 from the rotation support section 19 and swings the sun visor 5 around the longitudinal shaft portion 17a. Then it comes into the use state (second use state) where it covers the upper portion of the side window 23 shown in FIG. 1(a). The sun visor 5 can thereby shield incident light such as sun light through the side window 23 into the compartment.

The occupant, from the second use state shown in FIG. 1(a), draws the supplementary body 27 out of the sun visor main body 25 as shown in FIG. 1(b) rearward relative to the vehicle (rightward in FIG. 1(a)). Then the sun visor 5 can shield the light in a wider area ranging to the vicinity of the center pillar 33 at the upper portion of the side window 23.

As the supplementary body 27 and the sun visor main body 25 are dimensioned substantially equally, in a state before the supplementary body 27 is drawn out, the sun visor 5 is sufficiently compact and therefore imposes small limitation on the visual range of the occupant.

If the supplementary body 27 is comprised of a plurality of small holes 27p, the occupant can keep a visual field therethrough for the exterior. More specifically, he or she can draw out the supplementary body 27 to expand the range of light shielding but suppresses limitation of the visual range.

In more detail, effects produced by the small holes 27p will be described below.

(1) a stroboscope effect: In a case where the plurality of small holes 27p is provided in particular in a lateral direction, a subject for vision at the exterior of the compartment is viewed by a left eye and a right eye alternately, thereby producing a frame-by-frame vision of motion or change of the subject. One can readily find out the subject at the exterior.

(2) a pinhole effect: By limiting light intensity led into the compartment by the small holes 27p, interference of the light is prevented and a range of focal planes (depth of focus) is widened, thereby making it easier to adjust the focus and see the subject at the exterior more clearly.

(3) a blinking phenomenon: In a case where the plurality of small holes 27p is provided in particular in a lateral direction, when the subject for vision makes a relative motion along the plurality of small holes 27p, a state where the subject blocks the small holes 27p (the subject is visible) and a state where the subject does not block the small holes 27p (the subject is invisible) arise reciprocally along the direction of the relative motion. By reciprocally raising the state where the small holes 27p are blocked (OFF: black out) and the state where not blocked (ON: lighting), a phenomenon of blinking is generated, thereby improving visibility.

Sometimes light P such as sun light intrudes through the small holes 27p into the compartment even though the supplementary body 27 is in use as shown in FIG. 1(b). In this case, as shown in FIG. 5(a), the supplementary body 27 (sun visor 5) can be swung from a vertical state A to a state B where it is tilted at an angle theta1 toward the inside of the compartment as shown in FIG. 5(a) and can be further swung to a state where it is tilted at an angle theta2. More specifically, by selecting a proper tilt, incident intensity of the light P such as sun light from the exterior to the interior of the compartment can be regulated. In the state B where it is tilted at the theta1, the incident intensity of the light P is reduced as compared with that in the state A. In the state C where it is tilted at the theta2, incidence of the light P is shut out. Even in these states, the occupant can keep a visual field at least in the horizontal direction or in the slightly downward direction. Even if it is tilted toward the exterior of the compartment, the incident intensity of the light P can be limited.

To limit the light P through the small holes 27p, any proper means may be further provided. Each of the small holes 27p may, for example, as shown in FIG. 5(b), be comprised of a projection 27i standing on its periphery. The projections 27i may be cylindrical as shown therein or in any proper shapes similar to a cylinder. The projections 27i can be provided so as to face the exterior of the compartment (at the side facing the sun visor main body 25) in the second use state, or may be on the opposite side.

As will be understood by comparing FIG. 5(b) with FIG. 5(a), even if the tilt angle of the supplementary body 27 (sun visor 5) is made smaller, the incident intensity of the light P is limited. Even when slightly tilted, it effectively prevents the occupant from being dazzled.

Further, each projection 27i reinforces and stiffens the periphery of each small hole 27p. This can compensate strength and stiffness reduction of the supplementary body 27 originated from the small holes 27p.

Figure 6:
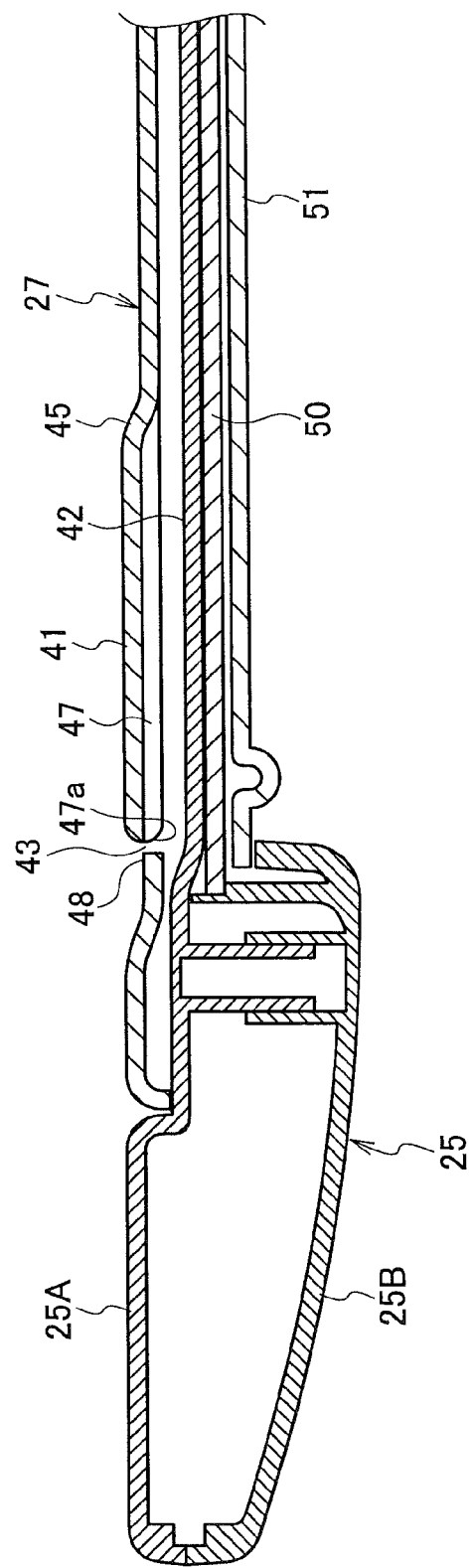
FIG. 6 is a sectional view taken from the line VI-VI of FIG. 1, which shows an initial state.
Figure 7:
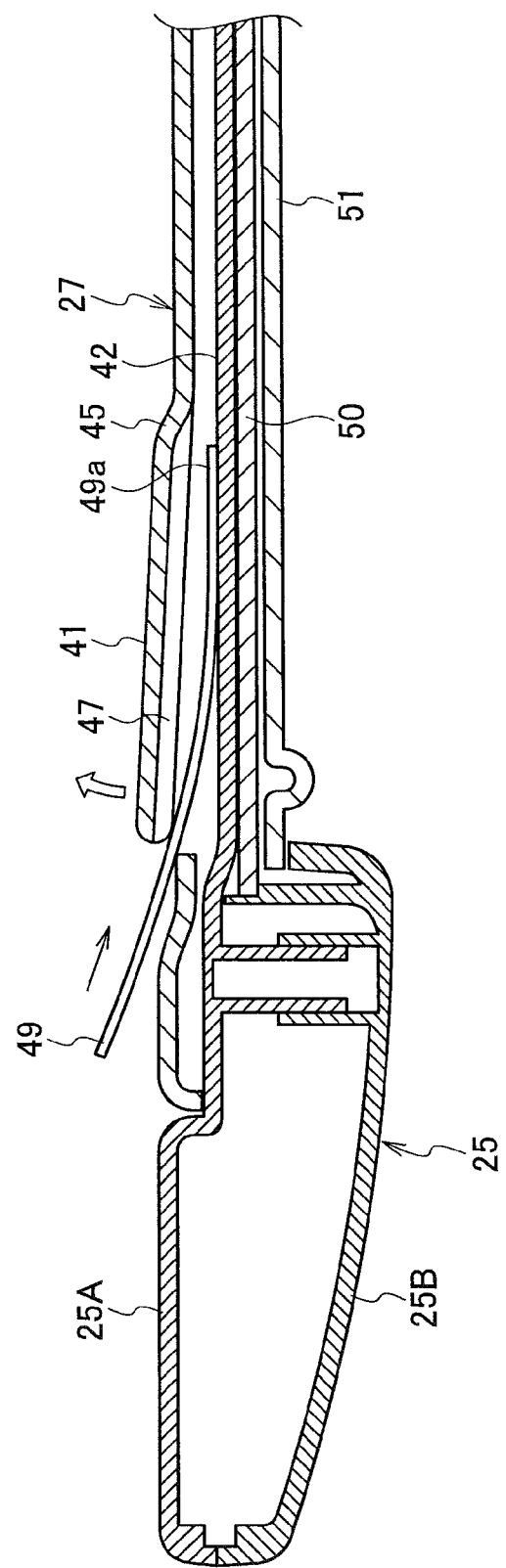
FIG. 7 is a sectional view taken from the line VI-VI of FIG. 1, which shows a state where any card such as a ticket is inserted into a slit.
Figure 8:
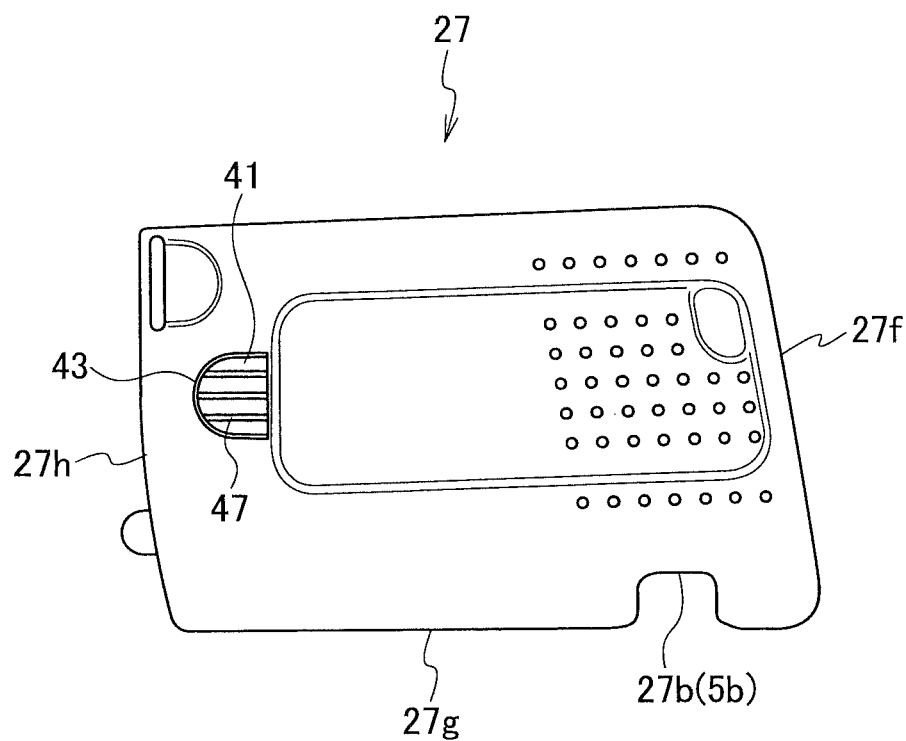
FIG. 8 is an elevational view showing a back side of the supplementary body.
Figure 9:
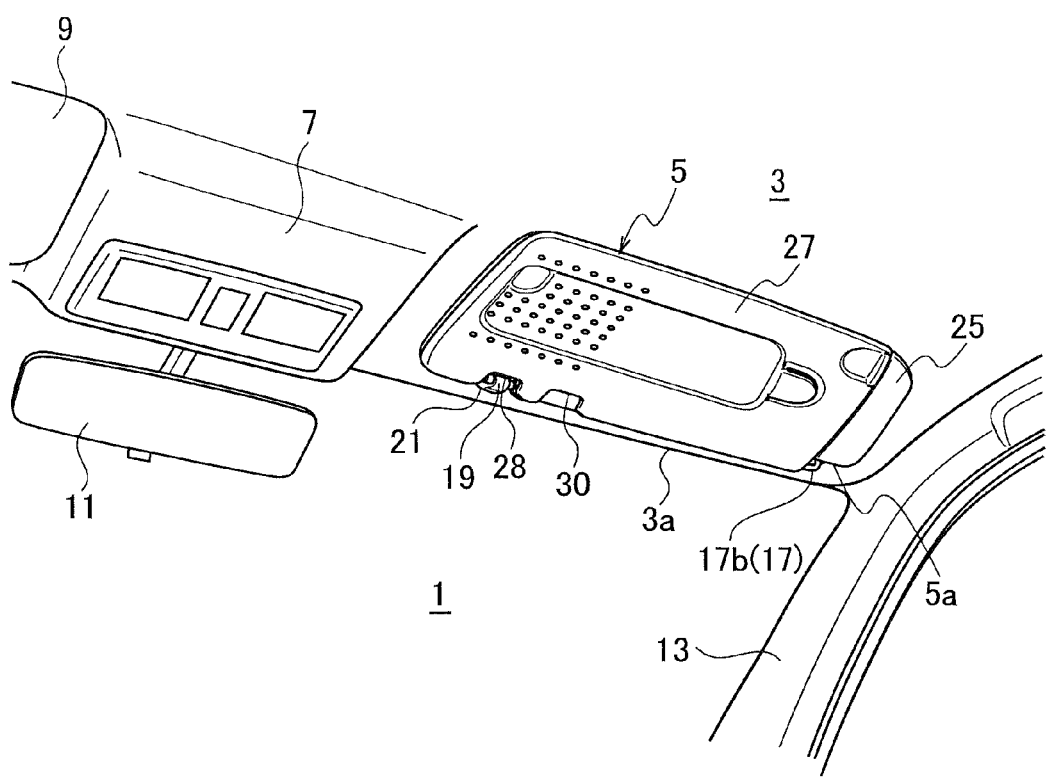
FIG. 9 is a perspective view depicting a sun visor for an automobile according to another embodiment of the present invention along with a part of a compartment including a windshield, which shows a state where it is retracted toward a ceiling.
Figure 11:
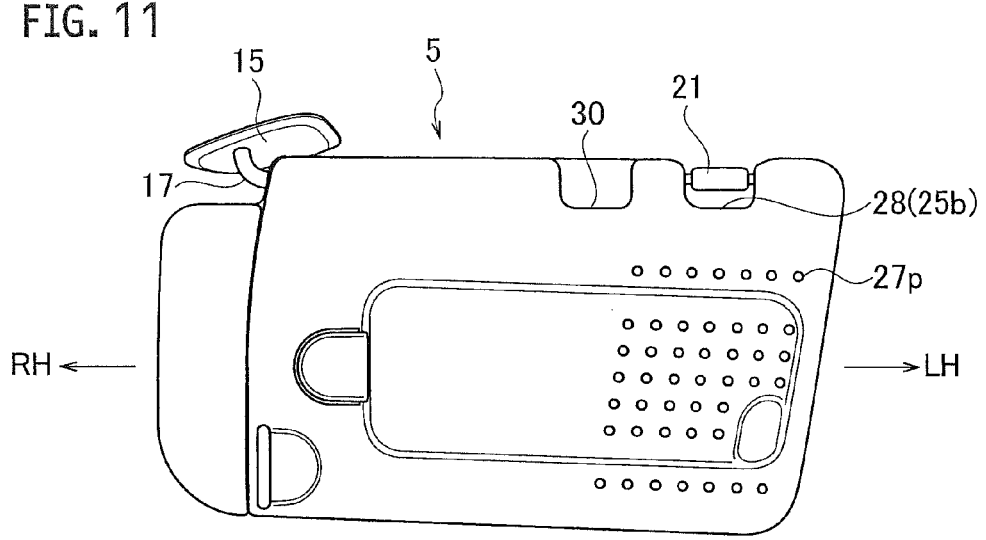
FIG. 11 is an elevational view of the sun visor for the automobile shown in FIG. 9.
Figure 12:
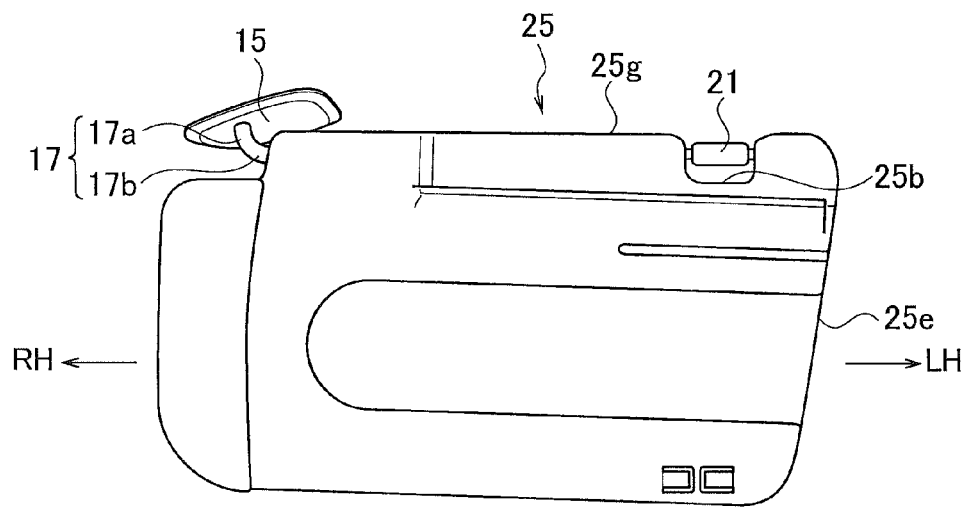
FIG. 12 is an elevational view of the sun visor for the automobile shown in FIG. 9 but shows only the main body.
Figure 13:
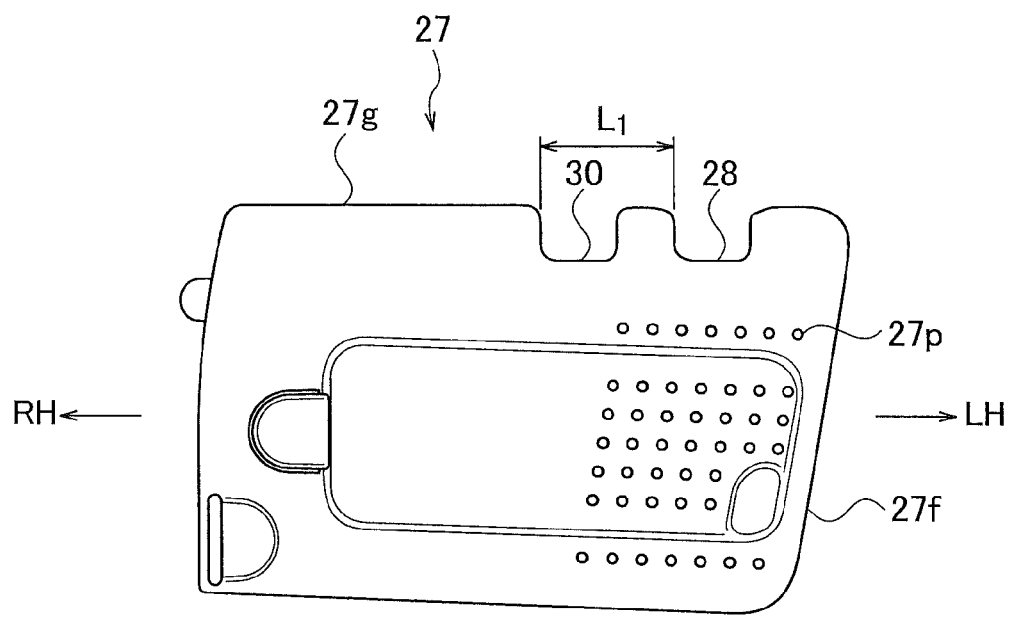
FIG. 13 is an elevational view of the sun visor for the automobile shown in FIG. 9 but shows only the supplementary body.

Referring to FIGS. 6 through 8, the supplementary body 27 may be comprised of a slit 43 close to an edge 27h opposed to the edge 27f, which penetrates the supplementary body 27 from the front to the rear. The slit 43 may be formed in proper dimensions adapted to receive insertion of various tickets. Further the slit 43 may be formed in a U-letter shape for example and a tongue piece 41 enclosed by the slit 43 may be, at its proximal portion 45, made to be a unitary body with the supplementary body 27. The tongue piece 41 has flexibility centered on the vicinity of the proximal portion 45.

The tongue piece 41 may, in the vicinity of the proximal portion 45, have a proper step relative to the supplementary body 27. To stiffen the tongue piece 41, a plurality of ribs 47 running from the proximal portion 45 toward the slit 43 may be provided at the back thereof. The direction where the ribs 47 run may be corresponding to the direction where the supplementary body 27 is drawn out. Tip ends 47a of the ribs 47 may be properly rounded.

The sun visor main body 25 has a face 42 in parallel with and close to the supplementary body 27. Meanwhile the sun visor main body 25 may be comprised of a vanity mirror 50 having a cover 51.

The slit 43 is usable as a ticket holder. When a ticket 49 is as shown in FIG. 7 inserted through the slit 43, its tip end 49a is guided by the face 42 to get into the interior of the sun visor 5. Then, the tongue piece 41, as having flexibility, slightly warps as indicated by the arrow shown in the drawing so as to facilitate entry of the ticket 49. Further by means of the resilience of the tongue piece 41 and the resilience of the ticket 49 of itself, the ticket 49 is thrusted onto the face 42, thereby being frictionally supported thereby and prevented from falling off.

Referring to FIG. 1, in regard to a region D where the supplementary body 27 drawn out to the maximum limit overlaps the sun visor main body 25, the tongue piece 41 and the slit 43 are preferably formed in the range of this region D. Even if the supplementary body 27 is drawn out to the maximum limit, as the face 42 faces backs of them, the face 42 can keep supporting the ticket 49.

Further as being apparent from FIG. 1, in the second use state where the sun visor 5 is directed toward the side window 23, the ticket holder by the slit 43 is disposed at the front relative to the vehicle and the ticket 49 can be inserted backward. Such a position and a direction of the slit 49 allow the occupant to easily insert or take off the ticket 49.

The sun visor 5 may be modified as shown in FIGS. 9 through 13.

Referring to FIG. 10(a), the edge 25e of the sun visor 5 may be formed to be substantially parallel with an end 11a of the room mirror 11 in the first use state. When the supplementary body 27 is not drawn out, the edge 25e is apart from the end 11a by a distance L0.

As described already, while the sun visor main body 25 is comprised of a cutout 25b for the horizontal shaft portion (catching member) 21, it is further comprised of a plurality of cutouts in this modified embodiment. Referring to FIGS. 9, 11 through 13, the supplementary body 27 is comprised of a first cutout 28 to be aligned with the cutout 25b when it is at the first position, and is further comprised of a second cutout 30 to be aligned with the cutout 25b when it is at the second position. The supplementary body 27 may be comprised of another cutout.

As shown in FIG. 10(a), as the first cutout 28 gets aligned with the cutout 25b when the supplementary body 27 is at the first position, the horizontal shaft portion 21 is exposed out of the first cutout 28. Therefore any interference does not occur when the horizontal shaft portion 21 is made engaged with or disengaged from the rotation support section 19.

Where a distance from one end of the first cutout 28 to a corresponding end of the second cutout 30 is denoted by L1, the distance L1 may be made substantially equal to the distance L0. Then, as being understood from FIG. 10(b), when the supplementary body 27 is drawn out to the second position, the edge 27f reaches the end 11a of the room mirror 11 and the second cutout 30 gets aligned with the cutout 25b. As the horizontal shaft portion 21 is exposed out of the second cutout 30, any interference does not occur too when the horizontal shaft portion 21 is made engaged with or disengaged from the rotation support section 19.

As described already, the sun visor 5 disengaged from the rotation support section 19, when being swung in the lateral direction around the longitudinal shaft portion 17a, gets into the use state (second use state) where it covers the upper portion of the side windows 23 as shown in FIG. 1(a). Further it may return from the second use state to the first use state. In this occasion, the second cutout 30 facilitates the action of the horizontal shaft portion 21 engaging with the rotation support section 19 and the action of disengagement.

Although the invention has been described above by reference to certain exemplary embodiments of the invention, the invention is not limited to the exemplary embodiments described above. Modifications and variations of the embodiments described above will occur to those skilled in the art, in light of the above teachings.

According to one or more embodiments of the present invention, a sun visor for a vehicle, which can expand the range of light shielding but suppress limitation of visual ranges of occupants, is provided.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A sun visor for a vehicle configured to be engaged with a support section provided in a compartment of the vehicle, comprising:
    a sun visor main body that shields light;
    a supplementary body slidably attached to the sun visor main body and slidable from a first position where the supplementary body overlaps the sun visor main body to a second position where the supplementary body is drawn out of the sun visor main body to shield the light in a wider area;
    a plurality of through-holes penetrating the supplementary body so as to have incident light partly pass through the through-holes; and
    projections standing on peripheries of the through-holes.

2. The sun visor of claim 1, wherein the sun visor main body is capable of being temporarily fixed along a side window of the vehicle and is so formed that an edge of the supplementary body directed to a center pillar of the vehicle becomes parallel to the center pillar when the supplementary body is drawn out in the second position and temporarily fixed along the side window.

3. The sun visor of claim 1, wherein the supplementary body comprises a slit configured to receive insertion of a ticket and the supplementary body and the sun visor main body are so positioned that the inserted ticket is pressed onto the sun visor main body to be frictionally supported.

4. The sun visor of claim 1, further comprising:
    a catching member configured to be caught by the support section and fixed to a rim portion of the sun visor main body; and
    a plurality of cutouts including a first cutout aligned with the catching member when the supplementary body is at the first position and a second cutout aligned with the catching member when the supplementary body is at the second position.

5. The sun visor of claim 1, wherein the projections surround each of the peripheries of the through-holes.

6. The sun visor of claim 1, wherein the projections are disposed so as to block some light from entering the through-holes.

7. The sun visor of claim 1, wherein the supplementary body comprises the projections.

* * * * *